June 8, 1926.
J. J. REITZ
1,587,858
ROPE HOLDER
Filed August 30, 1924    2 Sheets-Sheet 1
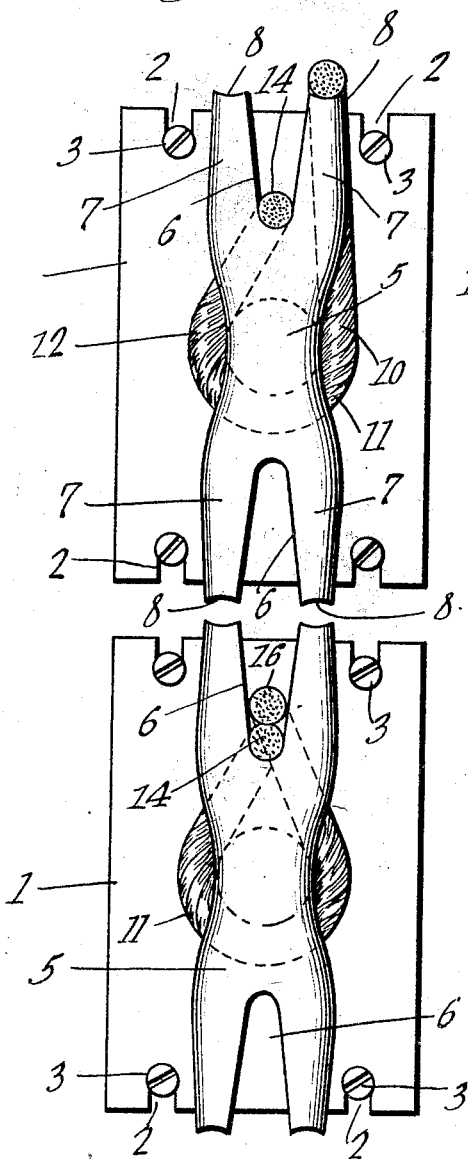
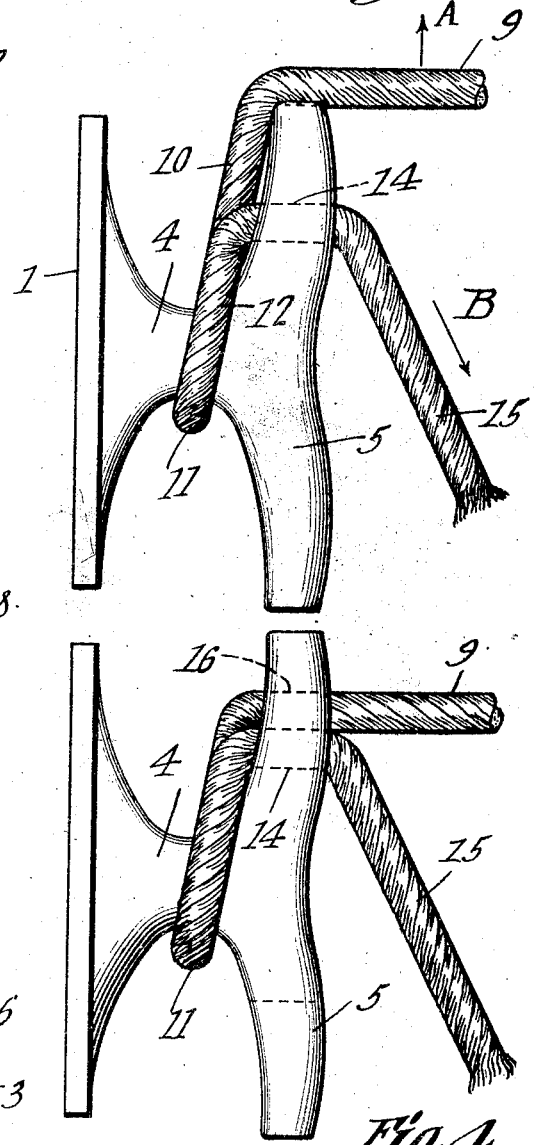
Inventor
J. J. Reitz
By
Attorney.

June 8, 1926.
J. J. REITZ
1,587,858
ROPE HOLDER
Filed August 30, 1924    2 Sheets-Sheet 2
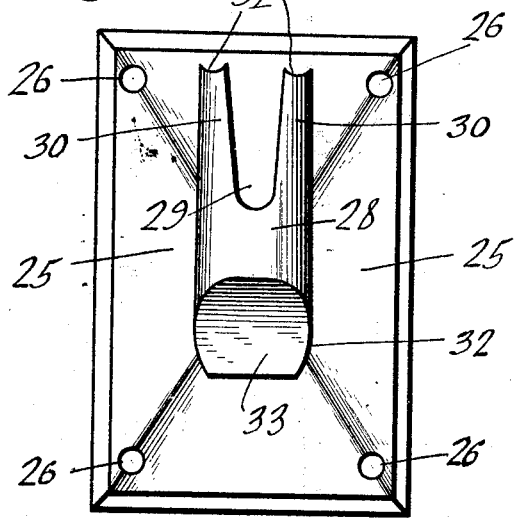
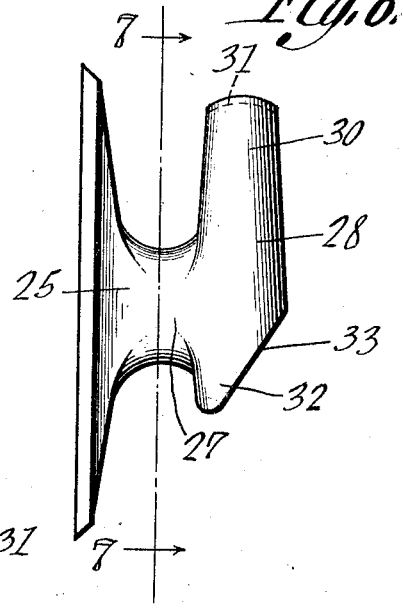
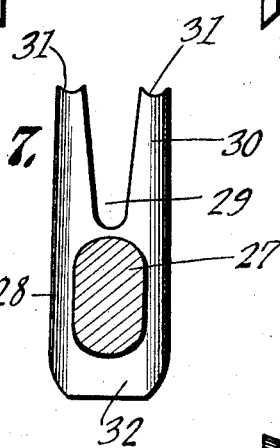
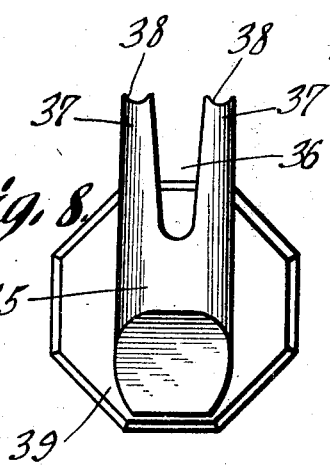
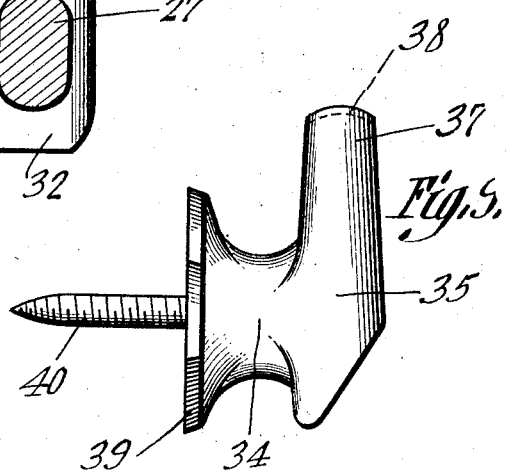
Inventor
J. J. Reitz
By C. A. Snow & Co
Attorneys.

Patented June 8, 1926.

1,587,858

UNITED STATES PATENT OFFICE.

JACOB J. REITZ, OF AKRON, OHIO.

ROPE HOLDER.

Application filed August 30, 1924. Serial No. 735,135.

This invention aims to provide a cleat so constructed that one part of a line may be held out of engagement with another part of the line, whilst the line is being tightened, it being possible to dislodge the first-specified part of the line, for engagement with the second-specified part of the line, thereby to belay the line after the same has been drawn taut.

It is within the province of the disclosure to improve generally and to enhance the utility of devices of that sort to which the invention appertains.

Although a preferred form has been shown, a mechanic, working within the scope of what is claimed, may make changes without departing from the spirit of the invention.

In the accompanying drawings:—

Figure 1 shows in elevation, a device constructed in accordance with the invention, the line being shown as it will appear whilst the slack is being taken up; Figure 2 is a similar view showing the line as it will appear after it has been belayed; Figure 3 is a side elevation, the line appearing as in Figure 1; Figure 4 is a side elevation, the line appearing as in Figure 2. Figure 5 is an elevation showing a modification; Figure 6 is a side elevation of the same modification; Figure 7 is a vertical sectional view taken on the line 7—7 of Figure 6; Figure 8 is a front elevation of another modification; Figure 9 is a side elevation.

The cleat comprises a base 1 having notches or openings 2 adapted to receive securing elements 3 whereby the cleat may be mounted on a support. The body of the cleat is marked by the numeral 4 and projects from the base 1 at a point near to the geometrical center of the base. The body 4 carries a transverse head 5 equipped in its ends with approximately V-shaped notches 6 defining arms 7 provided in their ends with seats 8.

The line which is to be tightened is extended horizontally as at 9, through one of the seats 8, the line being extended downwardly as at 10, around the body 4 of the cleat as at 11, upwardly as at 12, through one notch 6, as at 14, the free end of the line being extended downwardly as at 15.

The horizontal portion 9 of the line is snapped vertically, in the direction of the arrows A in Figure 3, and the end 15 of the line is pulled in the direction of the arrow B until the slack is taken up. Then the horizontal portion 9 of the line is pushed out of the seat 8 and drops down into the notch 6, on top of the part 14 of the line, as shown in Figures 4 and 2 at 16, thereby jamming the part 14 of the line in the notch 6 and belaying the line.

The distance between the seat 8 and the base of the notch 6 is so small, compared with the total length of the line, that the small amount of slack produced when the line drops from the seat into the notch, does not amount to much, and generally may be disregarded. However, when the line is arranged as shown in Figure 4, the little additional slack produced as above described, often may be gotten rid of, by snapping the horizontal part of the line as hereinbefore explained and as denoted by the arrows A, the end 15 of the line being hauled down.

In Figure 5 and in Figure 6, the base is shown at 25 and has openings 26 for the reception of securing elements. The body of the cleat appears at 27 and the head is shown at 28. There is a notch 29 in one end only of the head 28, the notch defining arms 30 having seats 31 in their ends. The head 28 has a short projection 32 at its lower end, which aids in retaining the line, the projection 32 being beveled inwardly as at 33.

In Figures 7 and 8, the body 34, the head 35, the notch 36, the arms 37, and the seats 38 are constructed as shown in Figures 5 and 6, but the base 39 is of octagonal outline and has a rearwardly projecting attaching screw 40.

I claim:

In a device of the class described, a cleat comprising a base, a body projecting from the base at right angles thereto, and a transverse head carried by the body and disposed approximately parallel to the base, the head being provided with a terminal notch of approximately V-shape, the notch defining arms provided in their ends with seats, the axes of the seats being disposed at right angles to the base, and the seats being so shallow that a line located therein may be dislodged readily therefrom, for reception in the notch.

In testimony that I claim the foregoing as my own, I have hereto affixed my signature.

JACOB J. REITZ.